(12) United States Patent
Iguchi

(10) Patent No.: US 12,724,123 B2
(45) Date of Patent: Sep. 1, 2026

(54) DISTANCE MEASURING APPARATUS AND LIGHT EMITTING DEVICE FOR DISTANCE MEASUREMENT

(71) Applicant: FUJIFILM Business Innovation Corp., Tokyo (JP)

(72) Inventor: Daisuke Iguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 209 days.

(21) Appl. No.: 18/432,029

(22) Filed: Feb. 4, 2024

(65) Prior Publication Data

US 2024/0345222 A1 Oct. 17, 2024

(30) Foreign Application Priority Data

Apr. 13, 2023 (JP) ................................ 2023-065889

(51) Int. Cl.
*G01S 17/08* (2006.01)
*G01S 7/481* (2006.01)

(52) U.S. Cl.
CPC .......... *G01S 7/4815* (2013.01); *G01S 7/4816* (2013.01); *G01S 17/08* (2013.01)

(58) Field of Classification Search
CPC ...... G01S 7/4815; G01S 7/4816; G01S 17/08; G01S 17/10
See application file for complete search history.

(56) References Cited

U.S. PATENT DOCUMENTS 9,874,638 B2 1/2018 Dorrington et al.
11,922,606 B2 * 3/2024 Semenov ............... H04N 23/81

(Continued)

FOREIGN PATENT DOCUMENTS

CN 109240028 A * 1/2019 ............... G02B 7/36
EP 3964861 A1 * 3/2022 ........... G01S 7/4863

(Continued)

*Primary Examiner* — Jacob Y Choi
(74) *Attorney, Agent, or Firm* — JCIPRNET

(57) ABSTRACT

A distance measuring apparatus includes: plural light emitters that irradiate a target whose distance is to be measured with light and are arranged along a predetermined first direction; an optical unit that directs light so that in a case where one light emitter emits light, a light amount corresponding to a central part of the light emitter and a light amount of a boundary part with an adjacent light emitter are different and in a case where plural light emitters emit light, the light amount corresponding to the central part of the light emitter and the light amount corresponding to the boundary part are equal; a light emission control unit that controls ON and OFF of the light emitters, the light emission control unit controlling the light emitters in modes including a first lighting mode in which a combination of two or more light emitters along the first direction that is ON and a combination of two or more light emitters along the first direction that is OFF alternate, a first inversion mode in which ON and OFF are reverse to those in the first lighting mode, a second lighting mode in which a combination of two or more light emitters that is ON and a combination of two or more light emitters that is OFF alternate, the combination in the second lighting mode being shifted by at least one light emitter from the combination in the first lighting mode in the first direction, and a second inversion mode in which ON and OFF are reverse to those in the second lighting mode; and a distance measurement unit that, in a case where plural light receiving regions are provided corresponding to each of the light emitters along the first direction in a region where a light receiving unit receives light from the target, performs distance measurement on a basis of a light reception result in the first lighting mode and a light reception result in the first inversion mode in a light receiving region excluding a light receiving region corresponding to a first boundary part located at a boundary between ON and OFF in the first (Continued)

lighting mode, and performs distance measurement on a basis of a light reception result in the second lighting mode and a light reception result in the second inversion mode in a light receiving region excluding a light receiving region corresponding to a second boundary part located at a boundary between ON and OFF in the second lighting mode.

10 Claims, 14 Drawing Sheets

(56) References Cited

U.S. PATENT DOCUMENTS

| | | | | |
|---|---|---|---|---|
| 2015/0253429 | A1* | 9/2015 | Dorrington | G01S 7/4815<br>356/5.01 |
| 2017/0082746 | A1* | 3/2017 | Kubota | G01S 7/4865 |
| 2023/0243940 | A1* | 8/2023 | Mellot | G01S 7/4914<br>356/5.1 |
| 2023/0333219 | A1* | 10/2023 | Iguchi | G01S 7/484 |
| 2023/0333227 | A1* | 10/2023 | Iguchi | G01S 17/32 |
| 2024/0345222 | A1* | 10/2024 | Iguchi | G01S 7/4815 |

FOREIGN PATENT DOCUMENTS

| | | | | |
|---|---|---|---|---|
| GB | 2574058 A | * 11/2019 | | G01S 17/89 |
| GB | 2586551 A | * 2/2021 | | G03H 1/02 |
| GB | 2586552 A | * 2/2021 | | G03H 1/02 |

* cited by examiner

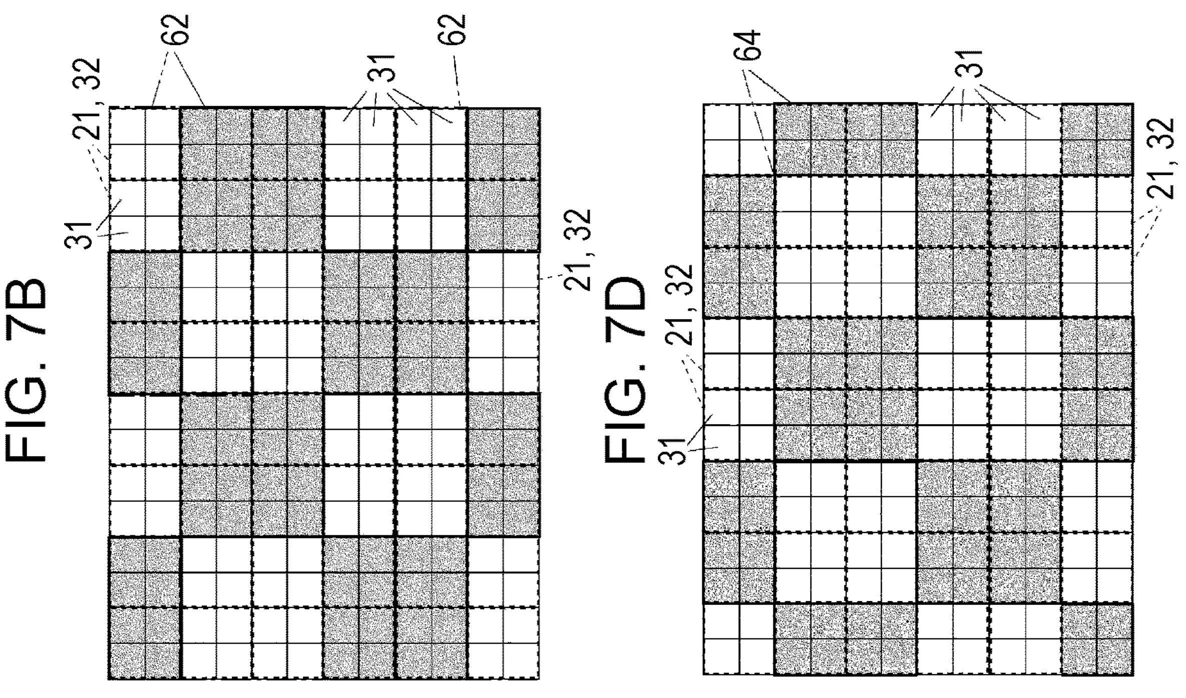
FIG. 7B
62
62
21, 32
31
31
21, 32
FIG. 7D
64
31
21, 32
21, 32
31
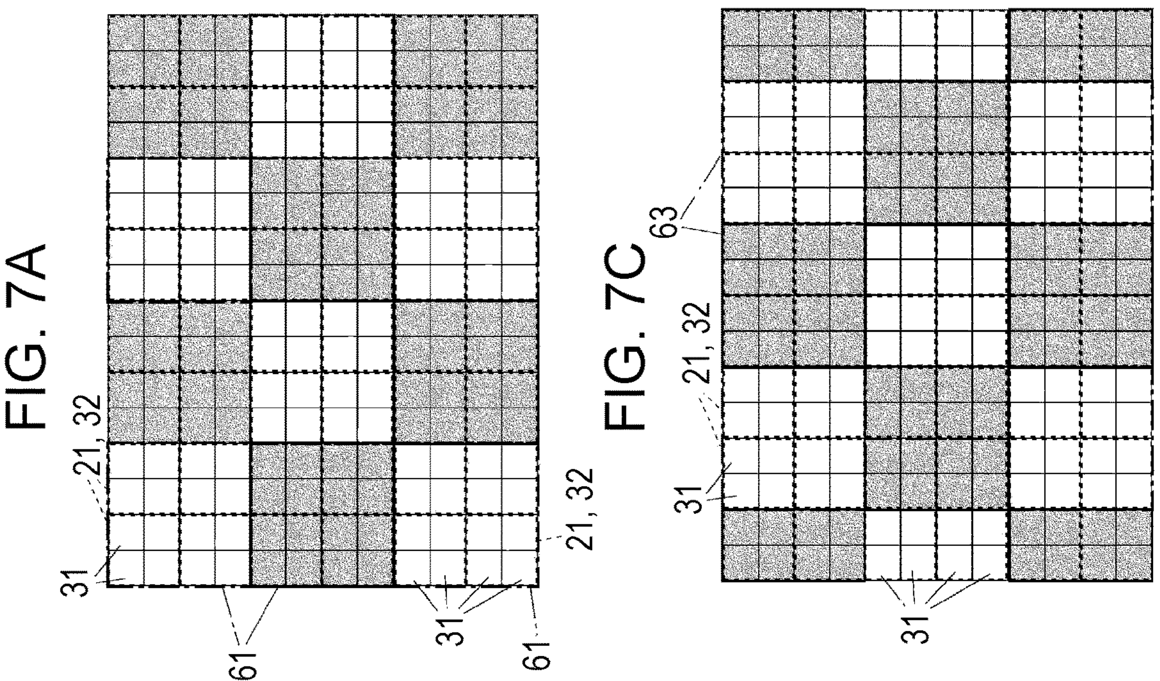
FIG. 7A
21, 32
31
21, 32
61
31
61
FIG. 7C
63
21, 32
31
31 to
LIGHT RADIATION
to
LIGHT RECEPTION (REFLECTION)
LIGHT RECEPTION (SCATTERING)
to
SW1
Q1
t1
SW2
Q2′

LIGHT RADIATION
LIGHT RECEPTION (REFLECTION)
LIGHT RECEPTION (SCATTERING)
SW1
SW2
Q2a

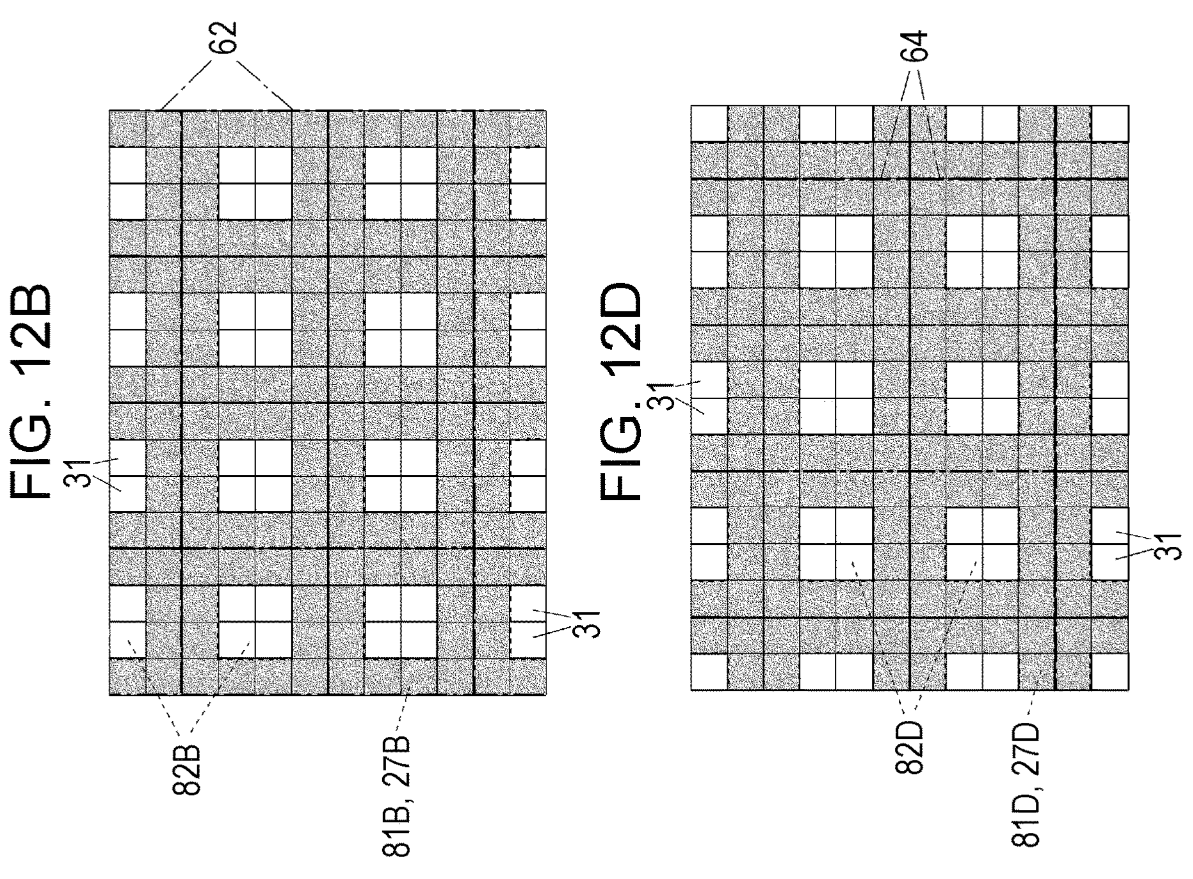
FIG. 12B
62
31
31
82B
81B, 27B
FIG. 12D
64
31
31
82D
81D, 27D
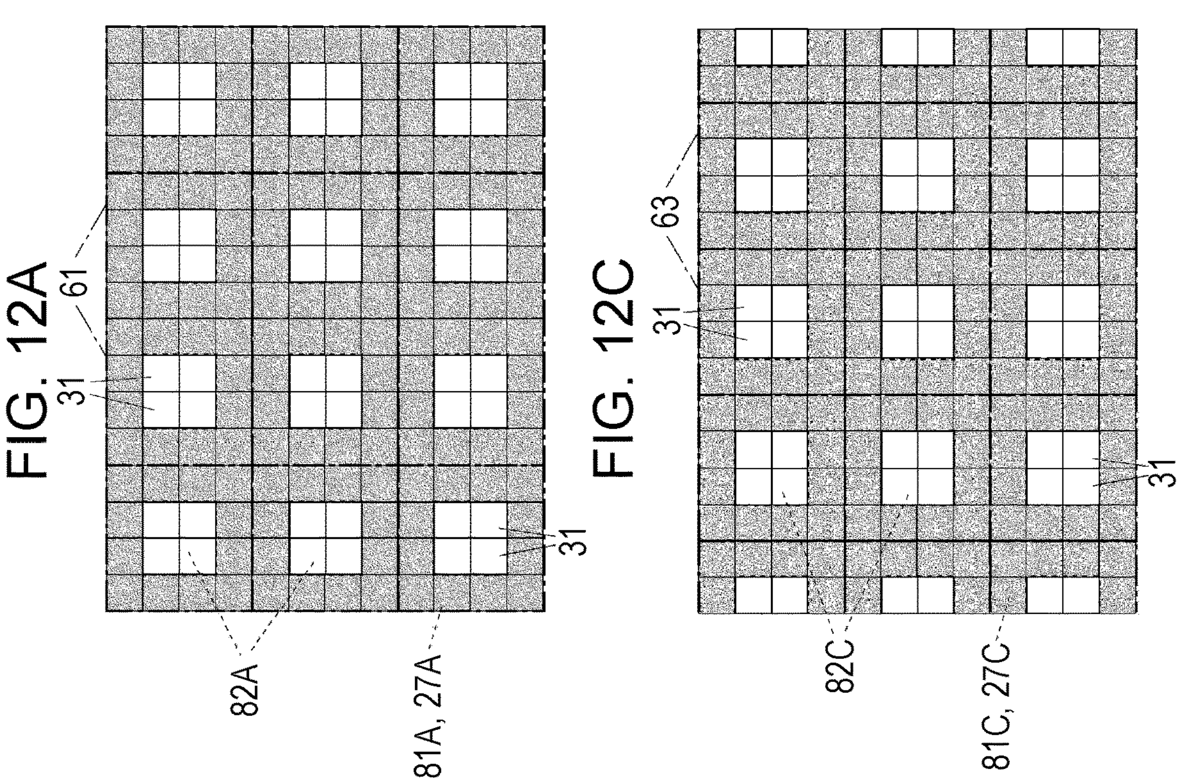
FIG. 12A
61
31
31
82A
81A, 27A
FIG. 12C
63
31
31
82C
81C, 27C $f_0$
LIGHT EMISSION
LIGHT RECEPTION
$\phi$
SW1 (0°)
Q0°
SW2 (180°)
Q180°
SW1 (90°)
Q90°
SW2 (270°)
Q270°
PHASE DIFFERENCE $\phi = \arctan\left(\frac{Q90° - Q270°}{Q0° - Q180°}\right)$
DISTANCE $L = \frac{1}{2}\left(\frac{\phi}{2\pi}\right)\cdot\lambda = \frac{1}{2}\cdot\left(\frac{\phi}{2\pi}\right)\cdot\left(\frac{c}{f_0}\right) = \frac{\phi}{4\pi f_0}\cdot c$ MODIFICATION 1
→ FIRST DIRECTION →
FIRST LIGHTING MODE
FIRST INVERSION MODE
SECOND LIGHTING MODE
SECOND INVERSION MODE
OFF
ON MODIFICATION 2
→ FIRST DIRECTION →
FIRST LIGHTING MODE
FIRST INVERSION MODE
SECOND LIGHTING MODE
SECOND INVERSION MODE
OFF
ON

DISTANCE MEASURING APPARATUS AND LIGHT EMITTING DEVICE FOR DISTANCE MEASUREMENT

CROSS-REFERENCE TO RELATED APPLICATIONS

This application is based on and claims priority under 35 USC 119 from Japanese Patent Application No. 2023-065889 filed Apr. 13, 2023.

BACKGROUND

(i) Technical Field

The present disclosure relates to a distance measuring apparatus and a light emitting device for distance measurement.

(ii) Related Art

A technique disclosed in U.S. Pat. No. 9,874,638 (hereinafter referred to as Patent Literature 1) is conventionally known regarding a distance measuring apparatus that measures a distance to a target.

According to Patent Literature 1, both a regular reflected light component (a direct component, a direct path) and a diffusion/scattering light component (a global component, a multi-path) are observed in a case where a target is irradiated with light, and a spatial frequency of the global component is low. Based on this, Patent Literature 1 describes a technique of radiating light of a checker board pattern of a high spatial frequency, separating a direct-global component from an observation result, removing a global component coming from a position different from a distance measurement target position, that is, removing a multi-path, and measuring a distance on the basis of a direct component by a Time of Flight (ToF) method.

SUMMARY

In some cases, plural first light emitting groups are turned on and plural second light emitting groups are turned off, and then the plural first light emitting groups are turned off and the plural second light emitting groups are turned on. That is, in some cases, ON and OFF of the light emitting groups are controlled in a checkerboard pattern.

Aspects of non-limiting embodiments of the present disclosure relate to a technique of enabling distance measurement at a boundary part even in a case where some light emitting parts emit light in a light emitting device in which plural light emitting parts are arranged, and a light amount of a light emitting part corresponding to a boundary part between light emitting parts is adjusted so that an amount of received light corresponding to a central part of a light emitting part and an amount of received light corresponding to the boundary part are equal when the plural light emitting parts emit light.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a distance measuring apparatus including: plural light emitters that irradiate a target whose distance is to be measured with light and are arranged along a predetermined first direction; an optical unit that directs light so that in a case where one light emitter emits light, a light amount corresponding to a central part of the light emitter and a light amount of a boundary part with an adjacent light emitter are different and in a case where plural light emitters emit light, the light amount corresponding to the central part of the light emitter and the light amount corresponding to the boundary part are equal; a light emission control unit that controls ON and OFF of the light emitters, the light emission control unit controlling the light emitters in modes including a first lighting mode in which a combination of two or more light emitters along the first direction that is ON and a combination of two or more light emitters along the first direction that is OFF alternate, a first inversion mode in which ON and OFF are reverse to those in the first lighting mode, a second lighting mode in which a combination of two or more light emitters that is ON and a combination of two or more light emitters that is OFF alternate, the combination in the second lighting mode being shifted by at least one light emitter from the combination in the first lighting mode in the first direction, and a second inversion mode in which ON and OFF are reverse to those in the second lighting mode; and a distance measurement unit that, in a case where plural light receiving regions are provided corresponding to each of the light emitters along the first direction in a region where a light receiving unit receives light from the target, performs distance measurement on the basis of a light reception result in the first lighting mode and a light reception result in the first inversion mode in a light receiving region excluding a light receiving region corresponding to a first boundary part located at a boundary between ON and OFF in the first lighting mode, and performs distance measurement on the basis of a light reception result in the second lighting mode and a light reception result in the second inversion mode in a light receiving region excluding a light receiving region corresponding to a second boundary part located at a boundary between ON and OFF in the second lighting mode.

BRIEF DESCRIPTION OF THE DRAWINGS

Exemplary embodiments of the present disclosure will be described in detail based on the following figures, wherein:

FIGS. 7A to 7D are explanatory views for explaining a lighting mode of the first exemplary embodiment, FIG. 7A is an explanatory view for explaining a first lighting mode, FIG. 7B is an explanatory view for explaining a second lighting mode, FIG. 7C is an explanatory view for explaining a third lighting mode, and FIG. 7D is an explanatory view for explaining a fourth lighting mode;

FIG. 9A is a graph in a case where light emitting element groups are ON, and FIG. 9B is a graph in a case where the light emitting element groups are OFF;

FIG. 10A is a graph in a case where the light emitting element groups are ON, and FIG. 10B is a graph in a case where the light emitting element groups are OFF;

FIGS. 12A to 12D are explanatory views for explaining a distance measurement region of the first exemplary embodiment, FIG. 12A is an explanatory view for explaining a distance measurement region in the first lighting mode, FIG. 12B is an explanatory view for explaining a distance measurement region in the second lighting mode, FIG. 12C is an explanatory view for explaining a distance measurement region in the third lighting mode, and FIG. 12D is an explanatory view for explaining a distance measurement region in the fourth lighting mode;

FIG. 14A is an explanatory view for explaining Modification 1, and FIG. 14B is an explanatory view for explaining Modification 2.

DETAILED DESCRIPTION

Next, exemplary embodiments of the present disclosure are described as specific examples with reference to the drawings, but the present disclosure is not limited to the exemplary embodiments below.

Note that in the following description using the drawings, illustration of members other than members necessary for description is omitted as appropriate to facilitate understanding.

First Exemplary Embodiment

Figure 1:
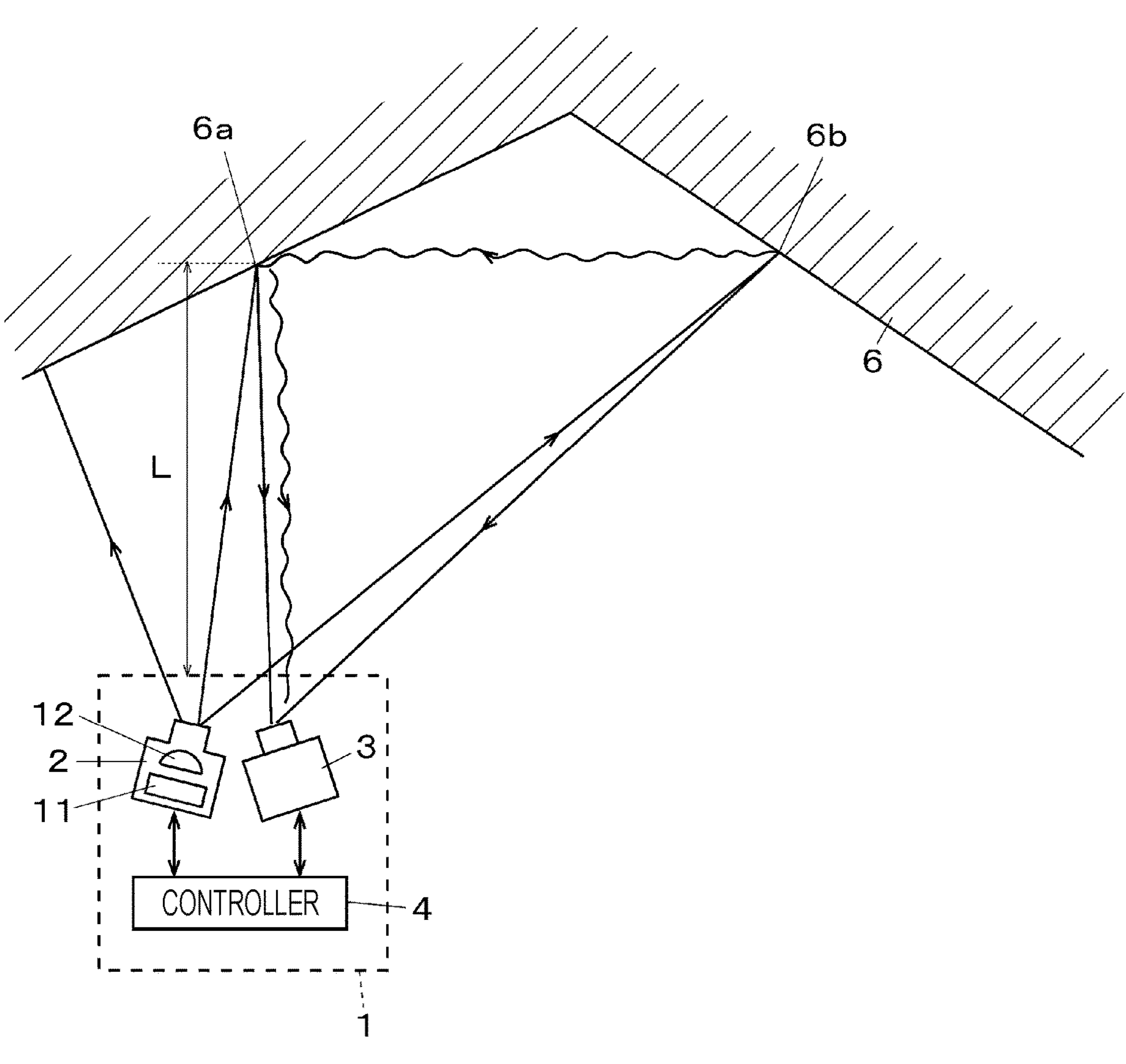
FIG. 1 is an overall explanatory view of a distance measuring apparatus of a first exemplary embodiment.

FIG. 1 is an overall explanatory view of a distance measuring apparatus of a first exemplary embodiment.

In FIG. 1, a distance measuring apparatus 1 of the first exemplary embodiment of the present disclosure includes a light emitting device 2, a light receiving device 3, and a controller 4, which is an example of a controller.

The light emitting device 2 includes a light emitting part 11, which is an example of a light source, and a lens 12, which is an example of an optical unit. The light emitting device 2 irradiates a target 6 whose distance is to be measured with light for distance measurement. The light receiving device 3 receives light from the target 6. The controller 4 controls ON and OFF of the light emitting device 2 and performs distance measurement by calculating a distance to the target 6 on the basis of the light received by the light receiving device 3.

Figure 2:
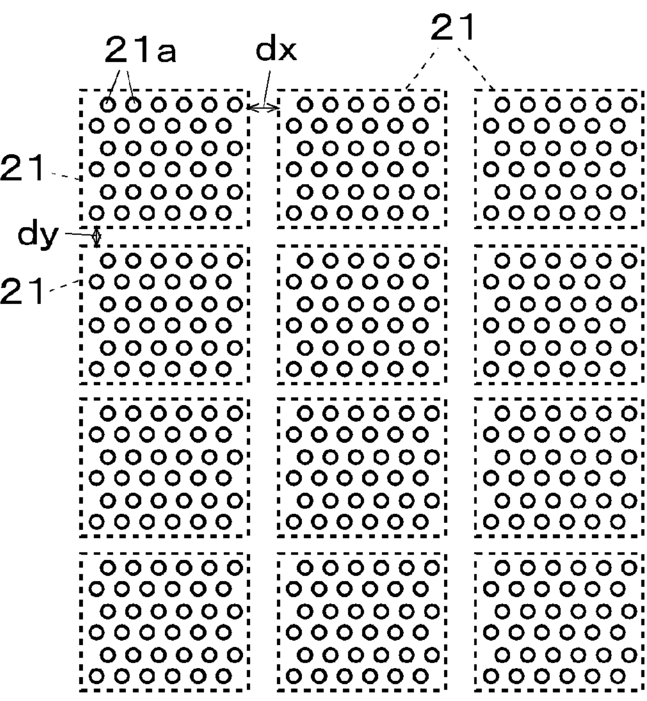
FIG. 2 is an enlarged view of substantial part of a light emitting part.

FIG. 2 is an enlarged view of a substantial part of the light emitting part.

In FIG. 2, in the light emitting part 11 of the first exemplary embodiment, plural light emitting element groups 21, which are an example of light emitters, are arranged at intervals dx along an X direction, which is an example of a first direction. In the first exemplary embodiment, plural light emitting element groups 21 are arranged at intervals dy along a Y direction, which is an example of a second direction. Accordingly, in the light emitting part 11 of the first exemplary embodiment, the plural light emitting element groups 21 are arranged in two directions, specifically, the X direction and the Y direction, that is, arranged in a plane direction. Although the intervals dx in the X direction are set equal and the intervals dy in the Y direction are set equal in the first exemplary embodiment, the intervals dx in the X direction may be set different and the intervals dy in the Y direction may be set different.

Each of the light emitting element groups 21 includes plural light emitting elements 21*a* that generate light.

Figure 3:
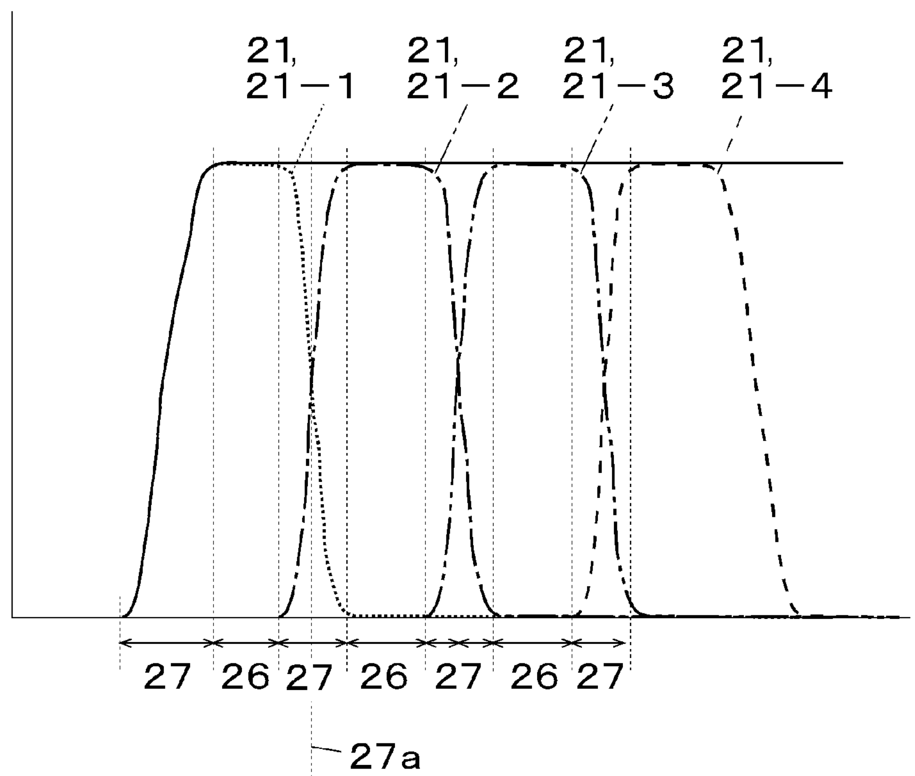
FIG. 3 is an explanatory view of a distribution of light radiated by a light emitting device of the first exemplary embodiment and is a graph whose horizontal axis represents a position and whose vertical axis represents a normalized light intensity.

FIG. 3 is an explanatory view of a distribution of light emitted by the light emitting device of the first exemplary embodiment and is a graph whose horizontal axis represents a position and whose vertical axis represents a normalized light intensity.

In FIG. 3, the lens 12 of the first exemplary embodiment directs light emitted from the plural light emitting element groups 21 so that the light that has been output from the light emitting part 11 and passed through the lens 12 has a uniform intensity in the X direction and the Y direction, as indicated by the solid line in FIG. 3. Specifically, in FIG. 3, the light emitting element groups 21 arranged in the X direction are given reference signs 21-1, 21-2, 21-3, and 21-4, . . . in order as an example. For example, in a case where the one light emitting element group 21-1 emits light, a light amount corresponding to a central part 26 of the light emitting element group 21-1 and a light amount corresponding to a boundary part 27 with the adjacent light emitting element group 21-2 are different, as indicated by the broken line in FIG. 3. Specifically, the light is directed by the lens 12 so that the light amount of the boundary part 27 becomes smaller as a distance from the central part 26 increases. A distribution of the light amount at the boundary part 27 is set so that the central part 26 and the boundary part 27 have a uniform light amount as a whole in a case where all the light emitting element groups 21-1 to 21-4 emit light. Accordingly, in a case where a light amount of the one light emitting element group 21-1 at an intermediate part 27*a* of the boundary part 27 in the X direction is 50% (see the dotted line in FIG. 3) of the light amount of the central part 26 and a light amount of the other light emitting element group 21-2 at the intermediate part 27*a* is 50% (see the line with alternate long and short dashes in FIG. 3) of a light amount of the central part 26, an overall light amount (see the solid line in FIG. 3) of the intermediate part 27*a* obtained in a case where both of the light emitting element groups 21-1 and 21-2 emit light is 50%+50%=100%, which is equal to the light amount of the central part 26. Note that although the X direction is taken as an example in FIG. 3, the same applies to the Y direction.

Figure 4:
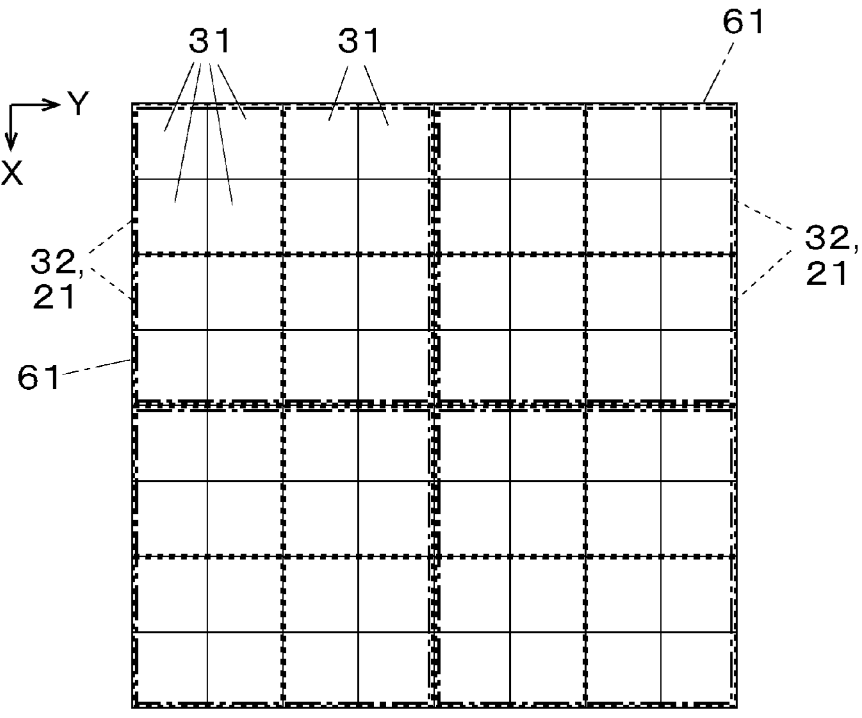
FIG. 4 is an explanatory view for explaining a light receiving region of a light receiving part of the first exemplary embodiment.

FIG. 4 is an explanatory view of a light receiving region of a light receiving part of the first exemplary embodiment.

In FIG. 4, the light receiving device 3 is divided into plural light receiving regions 31 that receive light from the target 6. The plural light receiving regions 31 of the first exemplary embodiment are adjacent in the X direction and the Y direction. An area of each of the light receiving regions 31 of the first exemplary embodiment is set smaller than an area of an irradiation region 32 of one light emitting element group 21. For example, two light receiving regions 31 in the X direction and two light receiving regions 31 in the Y direction, that is, four light receiving regions 31 in total (=two×two) are allocated to one irradiation region 32. That is, in the first exemplary embodiment, one irradiation region 32 is divided into four light receiving regions 31 to receive light and perform measurement.

Figure 5:
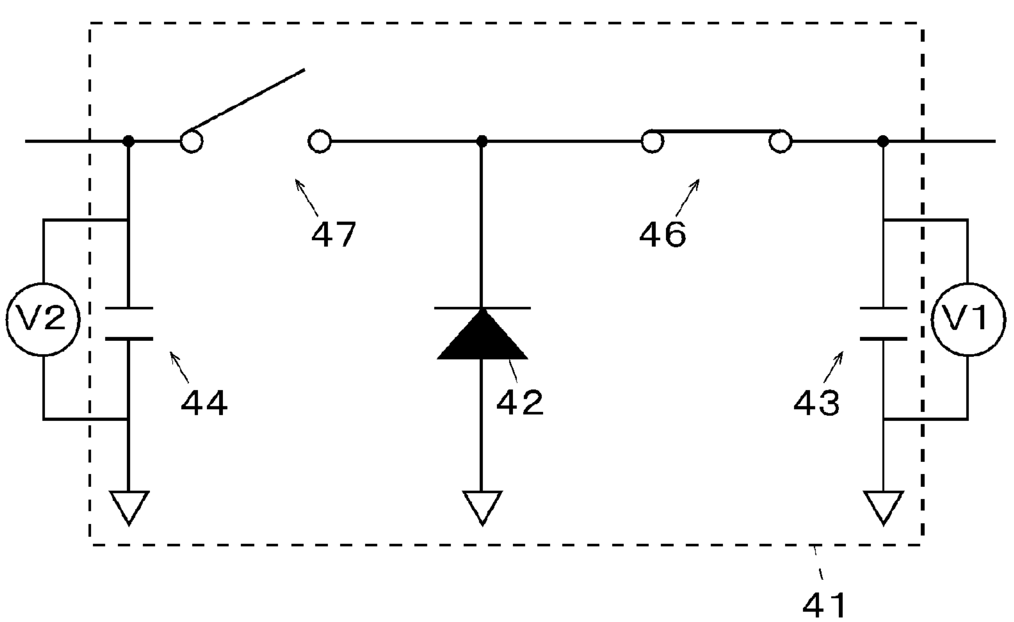
FIG. 5 is a conceptual diagram of an electric circuit of each light receiving element of the light receiving part.

FIG. 5 is a conceptual diagram of an electric circuit of each light receiving element of the light receiving part.

In the light receiving device 3 of the first exemplary embodiment, a light receiving unit 41 is disposed in each light receiving region 31. In FIG. 5, each light receiving unit 41 of the first exemplary embodiment includes a photodiode 42, which is an example of a light receiver. The photodiode 42 is electrically connected in parallel with a first capacitor 43 that is capable of accumulating a charge, which is an example of a first capacitor. Furthermore, the photodiode 42 and the first capacitor 43 are electrically connected in parallel with a second capacitor 44 that is capable of accumulating a charge, which is an example of a second capacitor, A first switch 46, which is an example of a first switch, is disposed between the photodiode 42 and the first capacitor 43, and a second switch 47, which is an example of a second switch, is disposed between the photodiode 42 and the second capacitor 44. The first switch 46 and the second switch 47 constitute a switch 46+47, which is an example of a switch that switches a connection destination of the photodiode 42 between the first capacitor 43 and the second capacitor 44.

Description of Controller of First Exemplary Embodiment

Figure 6:
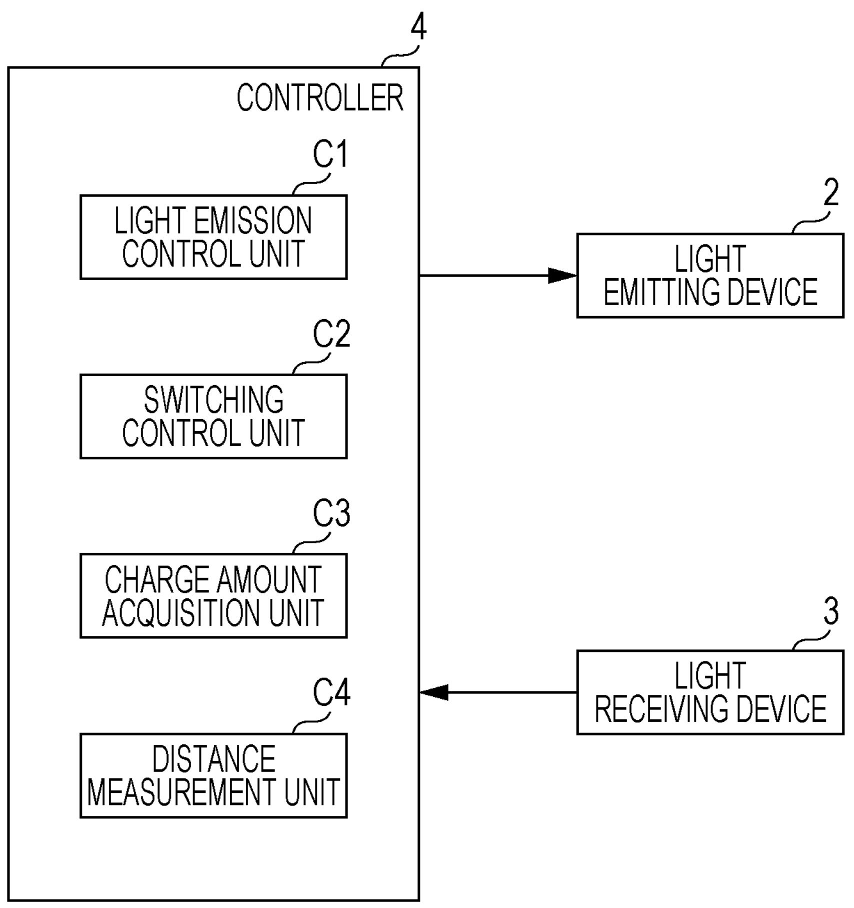
FIG. 6 is a functional block diagram of a controller of the first exemplary embodiment.

FIG. 6 is a functional block diagram of a controller of the first exemplary embodiment.

In FIG. 6, the controller 4 of the first exemplary embodiment includes an input/output interface I/O used, for example, for input and output of a signal to and from an outside. Furthermore, the controller 4 includes a read only memory (ROM) in which a program, information, and the like for performing necessary processing are stored. Furthermore, the controller 4 includes a random access memory (RAM) in which necessary data is temporarily stored. Furthermore, the controller 4 includes a central processing unit (CPU) that performs processing in accordance with a program stored in the ROM or the like. That is, the controller 4 of the first exemplary embodiment is a small-sized information processing apparatus, that is, a microcomputer. The controller 4 may therefore realize various functions by executing programs stored in the ROM or the like.

Functions of Controller 4

The controller 4 of the first exemplary embodiment includes the following functional units (functional modules, program modules) C1 to C4.

FIGS. 7A to 7D are explanatory views for explaining lighting modes of the first exemplary embodiment. FIG. 7A is an explanatory view for explaining a first lighting mode, FIG. 7B is an explanatory view for explaining a second lighting mode, FIG. 7C is an explanatory view for explaining a third lighting mode, and FIG. 7D is an explanatory view for explaining a fourth lighting mode.

A light emission control unit C1 controls ON and OFF of the light emitting element groups 21 during distance measurement. The light emission control unit C1 of the first exemplary embodiment controls light emission of the light emitting element groups 21 in a lighting mode of turning on or off the light emitting element groups 21 in a predetermined combination. Specifically, the light emission control unit C1 regards, as a first unit of light emission 61, two light emitting element groups 21 in the X direction and two light emitting element groups 21 in the Y direction, that is, a combination of four light emitting element groups 21 in total, and controls light emission of the light emitting element groups 21 so that the first unit of light emission 61 that is ON and the first unit of light emission 61 that is OFF alternate in the X direction and the first unit of light emission 61 that is ON and the first unit of light emission 61 that is OFF alternate in the Y direction, as illustrated in FIG. 7A. In FIG. 7A, the shaded parts indicate an ON state, and the other parts indicate an OFF state, and the ON and OFF pattern illustrated in FIG. 7A is referred to as the first lighting mode. The first lighting mode illustrated in FIG. 7A is a checkerboard pattern. After controlling light emission in the first lighting mode, the light emission control unit C1 controls light emission of the light emitting element groups 21 in a first inversion mode in which ON and OFF are reverse to those in the first lighting mode.

The light emission control unit C1 regards, as a second unit of light emission 62, a combination of light emitting element groups 21 shifted by one light emitting element group 21 from the first unit of light emission in the X direction, and controls light emission of the light emitting element groups 21 so that the second unit of light emission 62 that is ON and the second unit of light emission 62 that is OFF alternate in the X direction and the second unit of light emission 62 that is ON and the second unit of light emission 62 that is OFF alternate in the Y direction, as illustrated in FIG. 7B. The ON and OFF pattern illustrated in FIG. 7B is referred to as the second lighting mode. In other words, the second lighting mode illustrated in FIG. 7B is a checkerboard pattern shifted by one light emitting element group 21 from the first lighting mode in the X direction. After controlling light emission in the second lighting mode, the light emission control unit C1 controls light emission of the light emitting element groups 21 in a second inversion mode in which ON and OFF are reverse to those in the second lighting mode.

The light emission control unit C1 regards, as a third unit of light emission 63, a combination of light emitting element groups 21 shifted by one light emitting element group 21 from the first unit of light emission in the Y direction, and controls light emission of the light emitting element groups 21 so that the third unit of light emission 63 that is ON and the third unit of light emission 63 that is OFF alternate in the X direction and the third unit of light emission 63 that is ON and the third unit of light emission 63 that is OFF alternate in the Y direction, as illustrated in FIG. 7C. The ON and OFF pattern illustrated in FIG. 7C is referred to as the third lighting mode. In other words, the third lighting mode illustrated in FIG. 7C is a checkerboard pattern shifted by one light emitting element group 21 from the first lighting mode in the Y direction. After controlling light emission in the third lighting mode, the light emission control unit C1 controls light emission of the light emitting element groups 21 in a third inversion mode in which ON and OFF are reverse to those in the third lighting mode.

The light emission control unit C1 regards, as a fourth unit of light emission 64, a combination of light emitting element groups 21 shifted by one light emitting element group 21 from the first unit of light emission in the X direction and shifted by one light emitting element group 21 from the first unit of light emission in the Y direction, and controls light emission of the light emitting element groups 21 so that the fourth unit of light emission 64 that is ON and the fourth unit of light emission 64 that is OFF alternate in the X direction and the fourth unit of light emission 64 that is ON and the fourth unit of light emission 64 that is OFF alternate in the Y direction, as illustrated in FIG. 7D. The ON and OFF pattern illustrated in FIG. 7D is referred to as the fourth lighting mode. In other words, the fourth lighting mode illustrated in FIG. 7D is a checkerboard pattern shifted by one light emitting element group 21 from the first lighting mode in the X direction and Y direction. After controlling light emission in the fourth lighting mode, the light emission control unit C1 controls light emission of the light emitting element groups 21 in a fourth inversion mode in which ON and OFF are reverse to those in the fourth lighting mode.

Figure 8:
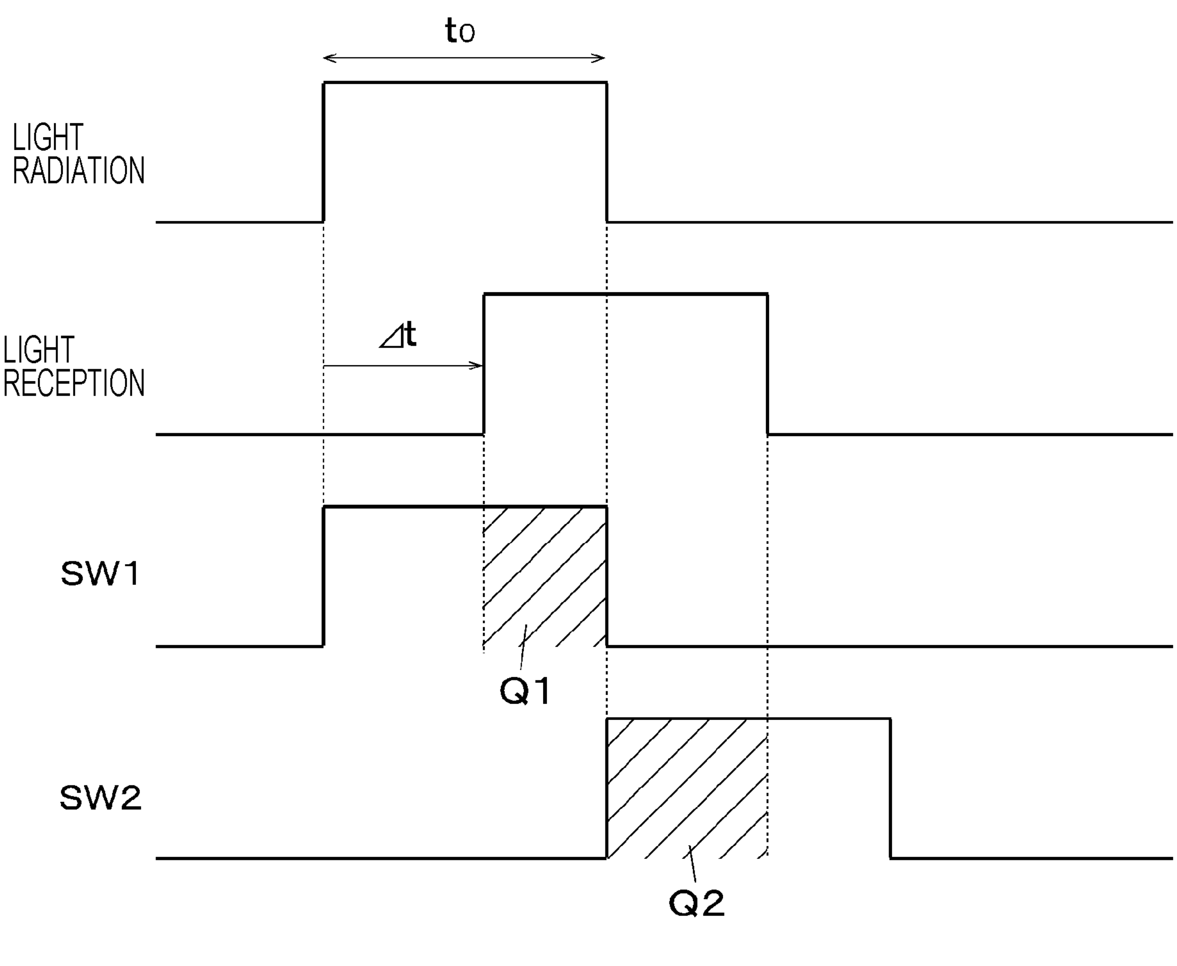
FIG. 8 is an explanatory view for explaining control timings of light radiation, light reception, a first switch, and a second switch of the first exemplary embodiment.

FIG. 8 is an explanatory view for explaining control timings of light radiation, light reception, the first switch, and the second switch according to the first exemplary embodiment.

Note that the horizontal axis of the graph of FIG. 8 represents time.

A switching control unit C2 controls switching of the switch 46+47. In the first exemplary embodiment, ON and OFF of the first switch 46 and the second switch 47 are switched. In each lighting mode and in each inversion mode, the switching control unit C2 of the first exemplary embodiment turns on the first switch 46 for a period to where the light emitting element group 21 is ON and turns on the second switch 47 for the period to at a timing at which the first switch 46 is turned off. Accordingly, during the period where the first switch 46 is ON, the photodiode 42 and the first capacitor 43 are connected, and a charge generated in the photodiode 42 upon receipt of light is accumulated in the first capacitor 43. During the period where the second switch 47 is ON, the photodiode 42 and the second capacitor 44 are connected, and a charge generated in the photodiode 42 upon receipt of light is accumulated in the second capacitor 44.

A charge amount acquisition unit C3 acquires a charge amount of each of the capacitors 43 and 44. A first charge amount Q1 of the first capacitor 43 is expressed by Q1=Ca·V1 where Ca is a capacity of the first capacitor 43 and V1 is a voltage at both ends of the first capacitor 43. Similarly, the second charge amount Q2 of the second capacitor 44 is expressed by Q2=Cb·V2. When the capacity Ca of the first capacitor 43 and the capacity of the second capacitor 44 are set identical, the charge amounts Q1 and Q2 are proportionate to the voltages V1 and V2.

A distance measurement unit C4 measures a distance to the target 6 on the basis of a light reception result of the light receiving device 3. The distance measurement unit C4 of the first exemplary embodiment performs distance measurement on the basis of the first charge amount Q1 and the second charge amount Q2 that are a light reception result of the photodiode 42. In FIG. 8, a time difference from a light emission start time T1 of the light emitting device 2 to a light reception start time T2 of the light receiving device 3 is expressed by the following formula (1):

$$\Delta t = t0 \cdot Q2/(Q1+Q2) \quad \text{formula (1)}$$

Note that in a case where the capacities of the capacitors 43 and 44 are identical, the time difference is expressed by the following formula (1'):

$$\Delta t = t0 \cdot V2/(V1+V2) \quad \text{formula (1')}$$

The time difference Δt is a period it takes for light to make a round-trip to the target 6, and therefore a distance L of one way to the target 6 is calculated from the time difference Δt and speed of light c by the following formula (2):

$$L = (c \cdot \Delta t)/2 \quad \text{formula (2)}$$

Figures 9A, 9B:
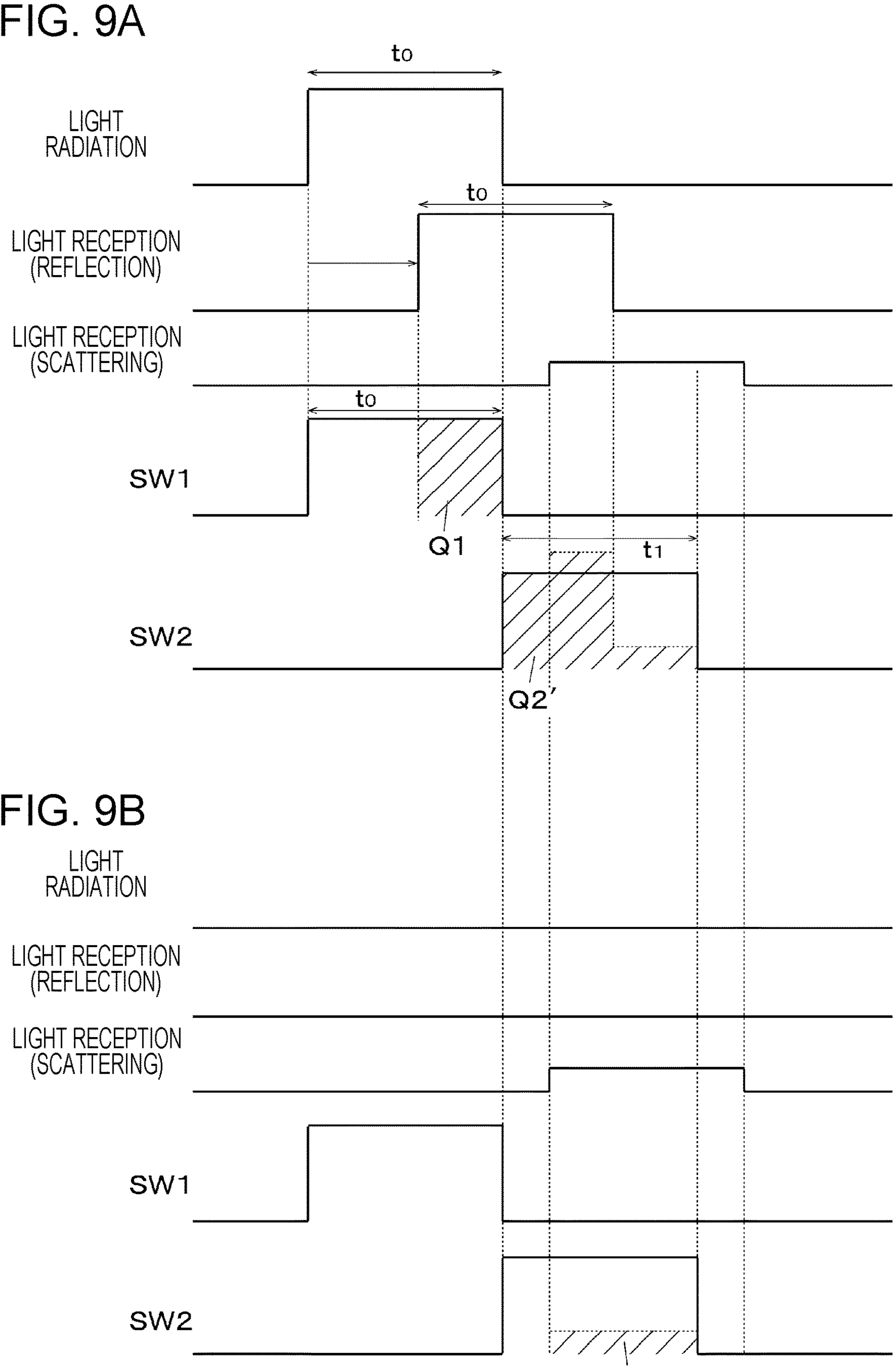
FIGS. 9A and 9B are explanatory views for explaining control timings of light radiation, light reception, the first switch, and the second switch of the distance measuring apparatus of the first exemplary embodiment under influence of scattering light.

FIGS. 9A and 9B are explanatory views for explaining control timings of light radiation, light reception, the first switch, and the second switch of the distance measuring apparatus of the first exemplary embodiment under influence of scattering light. FIG. 9A is a graph in a case where the light emitting element groups are ON, and FIG. 9B is a graph in a case where the light emitting element groups are OFF.

In FIG. 1, in the first exemplary embodiment, light received by the light receiving regions 31 that measure a distance to a distance measurement target position 6*a* is ideally reflected light from the distance measurement target position 6*a* and is ideally derived from the formula (2). In reality, however, the light received by the light receiving regions 31 that measure a distance to the distance measurement target position 6*a* includes not only the reflected light from the distance measurement target position 6*a*, but also scattering light from another position 6*b*. In FIGS. 9A and 9B, the scattering light is received at a later timing than the reflected light, and a light amount of the received scattering light is smaller than a light amount of the received reflected light. However, a charge generated upon receipt of the scattering light is also accumulated in the second capacitor 44. This makes a second charge amount Q2' larger than an accurate second charge amount Q2, as illustrated in the example of FIG. 9A. Accordingly, the time difference Δt becomes larger than an accurate value. That is, a multi-path error occurs. In view of this, in the distance measuring apparatus 1 of the first exemplary embodiment, light is radiated not only in a lighting mode, but also in an inversion mode. In FIGS. 9A and 9B, among the light emitting element groups 21 of the first exemplary embodiment, the light emitting element groups 21 that are ON in the first lighting mode are OFF (are not ON) in the first inversion mode, and the light emitting element groups 21 that are OFF in the first lighting mode are ON in the first inversion mode. The same applies to the second to fourth lighting modes and the second to fourth inversion modes. In the light receiving regions 31 corresponding to the light emitting element groups 21 that are ON in the first lighting mode, a light reception result including reflected light and scattering light (the second charge amount Q2') is obtained in the first lighting mode, but a light reception result including only scattering light (a second charge amount Q2a) is obtained in the first inversion mode. Therefore, by subtracting the light reception result in the first inversion mode from the light reception result in the first lighting mode (Q2'−Q2a=Q2), influence of the scattering light may be canceled out, and an accurate time difference Δt may be calculated.

Figures 10A, 10B:
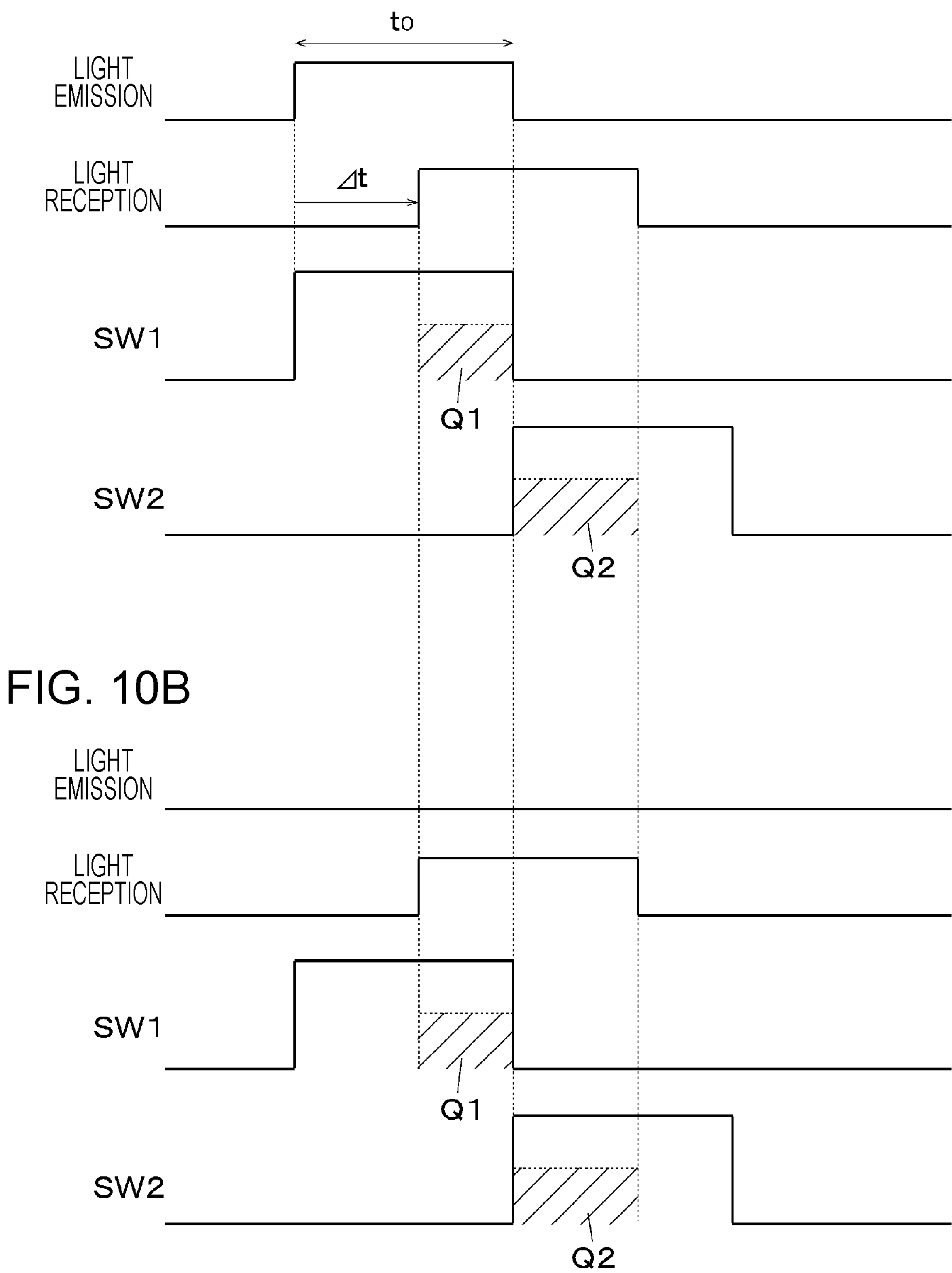
FIGS. 10A and 10B are explanatory views for explaining control timings of light radiation, light reception, the first switch, and the second switch of the distance measuring apparatus of the first exemplary embodiment at a boundary part between light emitting element groups.

FIGS. 10A and 10B are explanatory views for explaining control timings of light radiation, light reception, the first switch, and the second switch of the distance measuring apparatus of the first exemplary embodiment at a boundary part between light emitting element groups. FIG. 10A is a graph in a case where the light emitting element groups are ON, and FIG. 10B is a graph in a case where the light emitting element groups are OFF.

Figure 11:
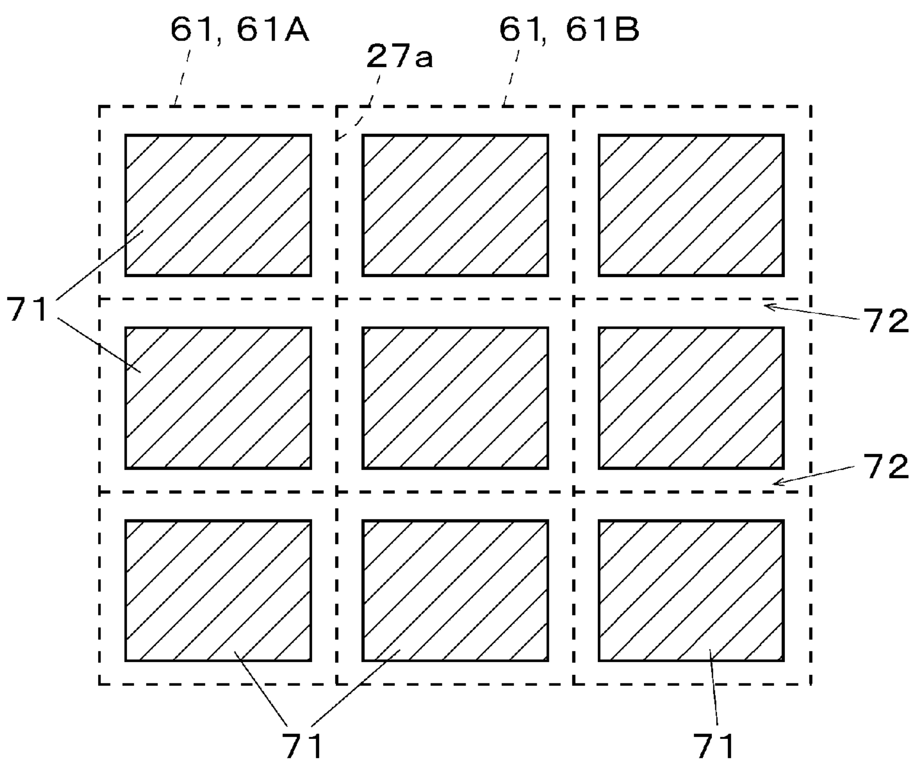
FIG. 11 is an explanatory view for explaining a distance measurable region.

FIG. 11 is an explanatory view for explaining a distance measurable region.

As described above, in the first exemplary embodiment, influence of scattering light is canceled out by using a light reception result in a lighting mode and a light reception result in an inversion mode. This causes a problem that distance measurement cannot be performed at the boundary part 27. This is described by taking the first lighting mode and the first inversion mode as an example. In FIG. 10A, a light amount at the intermediate part 27*a* of the boundary part 27 of the first unit of light emission 61 (61A) that is ON in the first lighting mode is 50%, and charge amounts accumulated in the first capacitor 43 and the second capacitor 44 are 50%. In FIG. 10B, in the first inversion mode, this first unit of light emission 61A is OFF, but the adjacent first unit of light emission 61 (61B) is ON, and a light amount of 50% from the adjacent first unit of light emission 61B is detected at the intermediate part 27*a* of the boundary part 27 of the first unit of light emission 61A. Accordingly, also in the inversion mode, charge amounts accumulated in the first capacitor 43 and the second capacitor 44 are 50%. Therefore, when the light reception result of FIG. 10B is subtracted from the light reception result of FIG. 10A to cancel out influence of scattering light, there occurs a problem such as greater influence of noise or the like since the charge amounts Q1 and Q2 become very small values such as zero or a negative value. As a result, as illustrated in FIG. 11, distance measurement cannot be performed at the boundary part 27 of the first unit of light emission 61, and island-shaped distance measurable regions 71 and a grid-frame-shaped distance unmeasurable regions 72 that surround the distance measurable regions 71 occur.

FIGS. 12A to 12D are explanatory views for explaining a distance measurement region of the first exemplary embodiment. FIG. 12A is an explanatory view for explaining a distance measurement region in the first lighting mode, FIG. 12B is an explanatory view for explaining a distance measurement region in the second lighting mode, FIG. 12C is an explanatory view for explaining a distance measurement region in the third lighting mode, and FIG. 12D is an explanatory view for explaining a distance measurement region in the fourth lighting mode.

In view of this, in a case where light is radiated in the first lighting mode and the first inversion mode, the distance measurement unit C4 of the first exemplary embodiment performs, on the basis of light reception results in the first lighting mode and the first inversion mode, distance measurement in a light receiving region 82A excluding a light receiving region 81A corresponding to a first boundary part 27A located at a boundary between ON and OFF (at a boundary of the first unit of light emission 61) in the first lighting mode, as illustrated in FIG. 12A. In a case where light is radiated in the second lighting mode and the second inversion mode, the distance measurement unit C4 performs, on the basis of light reception results in the second lighting mode and the second inversion mode, distance measurement in a light receiving region 82B excluding a light receiving region 81B corresponding to a second boundary part 27B located at a boundary between ON and OFF (at a boundary of the second unit of light emission 62) in the second lighting mode, as illustrated in FIG. 12B. Similarly, in a case where light is radiated in the third lighting mode and the third inversion mode and in a case where light is radiated in the fourth lighting mode and the fourth inversion mode, the distance measurement unit C4 performs, on the basis of light reception results in these lighting mode and inversion mode, distance measurement in a light receiving region 82C excluding a light receiving region 81C corresponding to a third boundary part 27C and in a light receiving region 82D excluding a light receiving region 81D corresponding to a fourth boundary part 27D, as illustrated in FIGS. 12C and 12D. Therefore, as for the light receiving region 81A where distance measurement is not performed in the first lighting mode and the first inversion mode, the distance measurement unit C4 of the first exemplary embodiment performs distance measurement in the second to fourth lighting modes and the second to fourth inversion modes in which the units of light emission 62 to 64 are shifted in the X direction and/or the Y direction. Therefore, in the distance measuring apparatus 1 of the first exemplary embodiment, the distance unmeasurable regions 72 illustrated in FIGS. 10A and 10B do not occur, and distance measurement may be performed in the entire region.

Effects of First Exemplary Embodiment

In the distance measuring apparatus 1 of the first exemplary embodiment having the above configuration, distance measurement is performed on the basis of light reception results obtained in a case where the light emitting device 2 is turned on in the lighting mode and the inversion mode. A technique of using a checkerboard pattern lighting mode and inverting ON and OFF to cope with a multi-path such as the one described in Patent Literature 1 is known. However, in a case where some light emitting element groups 21 are turned on as in the lighting mode and the inversion mode, there occurs a problem that the distance unmeasurable regions 72 occur as described with reference to FIGS. 9 and 10 in the light emitting device 2 in which the plural light emitting element groups 21 are arranged and a light amount corresponding to the boundary part 27 between the light emitting element groups 21 is adjusted so that an amount of received light corresponding to the central part 26 of the light emitting element group 21 and an amount of received light corresponding to the boundary part 27 are equal when the plural light emitting element groups 21 emit light.

On the other hand, in the distance measuring apparatus 1 of the first exemplary embodiment, distance measurement is performed by turning on the light emitting device 2 in the first to fourth lighting modes and the first to fourth inversion modes in which the units of light emission 61 to 64 are shifted in the X direction and/or the Y direction, and therefore distance measurement may be performed at the boundary parts 27A to 27D, and distance measurement may be performed in the entire region.

If an arrangement in which a light amount of a boundary part changes rapidly in a pulse manner or a step manner instead of smoothly decreasing is taken in the configuration described in Patent Literature 1, the distance unmeasurable regions 72 do not occur. One method for rapidly changing a light amount of a boundary part in a pulse manner is a method using a digital micromirror device (DMD). However, the DMD is a device that individually controls a reflection angle of a minute mirror disposed for each light emitting element group, and is very sensitive and expensive and cannot fully exclude influence of diffusion/scattering light. On the other hand, in the light emitting device 2 of the first exemplary embodiment, influence of diffusion/scattering light may be removed with a configuration that requires lower cost than the DMD.

Second Exemplary Embodiment

Figure 13:
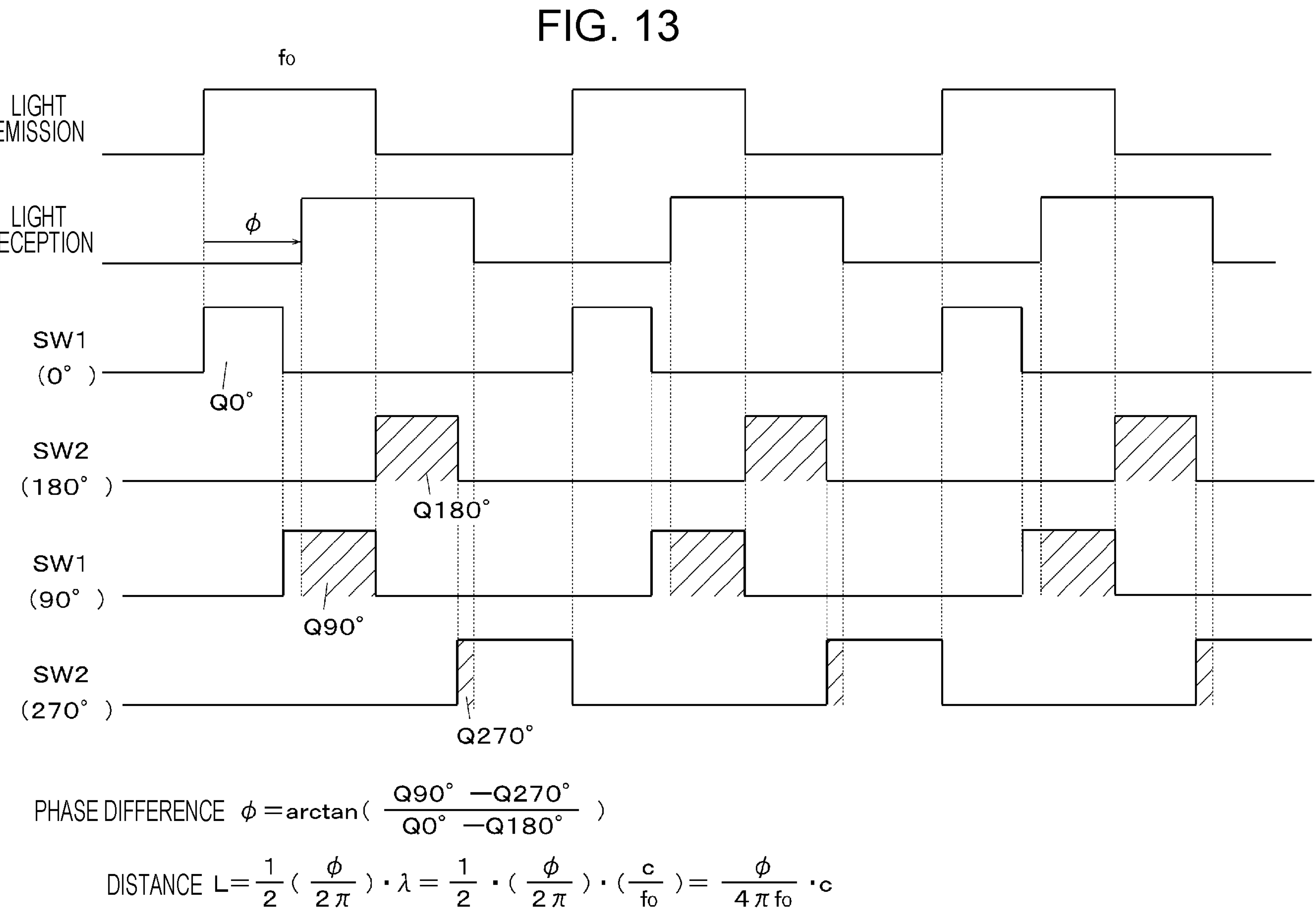
FIG. 13 is an explanatory view for explaining control timings of light radiation, light reception, a first switch, and a second switch of a distance measuring apparatus of a second exemplary embodiment and corresponds to FIG. 8.

FIG. 13 is an explanatory view of control timings of light radiation, light reception, a first switch, and a second switch of a distance measuring apparatus according to a second exemplary embodiment and corresponds to FIG. 8.

Next, the second exemplary embodiment of the present disclosure is described. Differences from the first exemplary embodiment are described below, and contents similar to those in the first exemplary embodiment are given identical reference signs, and detailed description thereof is omitted.

In FIG. 13, in a distance measuring apparatus 1 of the second exemplary embodiment, light having a rectangular wave shape that is repeatedly turned on and off, that is, continuous light is used as light radiated from a light emitting device 2. In the second exemplary embodiment, a case where continuous light of a frequency f0, which is a predetermined first time interval, is used is described as an example.

A switching control unit C2 of the second exemplary embodiment performs switching control of switches 46 and 47 in a first phase mode and a second phase mode. In the first phase mode, ON and OFF of the first switch 46 and the second switch 47 are switched at first switching timings corresponding to a light emission timing and an OFF timing of light emitting element groups 21. That is, in the first phase mode, a phase difference of a switching timing of the first switch 46 with respect to a cycle of the light emission timing is 0°, and a phase difference of a switching timing of the second switch 47 is 180° with respect to the cycle of the light emission timing.

In the second phase mode, ON and OFF of the first switch 46 and the second switch 47 are switched at a second switching timing whose phase is shifted from the first phase mode. In the second exemplary embodiment, for example, the phase of the second switching timing is shifted by 90° from the phase of the first switching timing. That is, in the second phase mode, a phase difference of a switching timing of the first switch 46 is 90° with respect to the cycle of the light emission timing, and a phase difference of a switching timing of the second switch 47 is 270° with respect to the cycle of the light emission timing.

A charge amount acquisition unit C3 of the second exemplary embodiment acquires a first charge amount Q0° of a first capacitor 43 and a second charge amount Q180° of a second capacitor 44 in the first phase mode, and acquires a first charge amount Q90° of the first capacitor 43 and a second charge amount Q270° of the second capacitor 44 in the second phase mode.

A distance measurement unit C4 of the second exemplary embodiment performs distance measurement on the basis of the charge amounts Q0°, Q180°, Q90°, and Q270°. In FIG. 13, a phase difference φ between a light emission start time T1 of the light emitting device 2 and a light reception start time T2 of a light receiving device 3 is expressed by the following formula (3):

$$\Phi = \arctan((Q90^\circ - Q270^\circ)/(Q0^\circ - Q180^\circ)) \quad \text{formula (3)}$$

This phase difference q occurs when light makes a round-trip to the target 6, and therefore a distance L to the target 6 may be calculated from the phase difference q, speed of light c, and frequency f0 by the following formula (4):

$$L = (c \cdot \varphi)/(4\pi \cdot f0) \quad \text{formula (4)}$$

Therefore, the distance measurement unit C4 of the second exemplary embodiment performs distance measurement by a continuous wave phase difference method.

Effects of Second Exemplary Embodiment

In the distance measuring apparatus 1 of the second exemplary embodiment including the configuration, first to fourth lighting modes and first to fourth inversion modes are combined with the continuous wave phase difference method. In a case where the continuous wave phase difference method is not combined, such a situation may occur in which, for example, in a case where background light such as solar light is strong, a photodiode 42 receives light and a charge is accumulated in the capacitors 43 and 44 even during non-light-emission state (OFF state) of the light emitting element groups 21, and accuracy of distance measurement based on a light reception result of light from the light emitting device 2 decreases. In the example illustrated in FIG. 13, no charge is supposed to be accumulated in Q0° due to light emission of the light emitting device 2, and a charge amount observed as Q0° is a charge amount resulting from background light and corresponds to a charge amount accumulated during the non-light-emission state. Therefore, by subtracting this charge amount accumulated during the non-light-emission state, highly-precise distance measurement in which influence of background light has been canceled out may be performed.

Note that in the second exemplary embodiment, distance measurement at the first frequency f0 of continuous light and distance measurement at a second frequency f1 (an example of a second time interval) different from the first frequency f0 may be performed. In a case where a distance to the target 6 is large, light reception may be delayed by one cycle or more from light emission. In this case, in a case where distance measurement is performed by the continuous wave phase difference method by using only the single frequency f0, it is difficult to distinguish whether the delay is less than one cycle, one cycle or more and less than two cycles, or two cycles or more and less than three cycles. In view of this, in a case where the frequencies f0 and f1 of continuous wave are different, for example, in a case where f1=2×f0, it is desirable to use both of a result of the first frequency f0 and a result of the second frequency f1 since more accurate distance measurement may be performed.

In the distance measurement using the continuous wave phase difference method of the second exemplary embodiment, according to a conventional Time of Flight (ToF) distance measurement method using a divided radiation light source, it is typical to sequentially turn on an irradiation block one by one and sequentially acquire a distance measurement value of a corresponding field of illumination (FOI) region. According to this configuration, for example, in a case where two phase modes are performed by using two frequencies, processing (integration processing) needs to be performed four times for each irradiation block, and in a case where there are 64 irradiation blocks, integration needs to be performed 256 times (=64×4) in total. On the other hand, in the distance measuring apparatus of the second exemplary embodiment, integration processing needs to be performed only 32 times in total, specifically, (8 times in total, which correspond to the lighting modes and the inversion modes)×(4 times for each mode) irrespective of the number of blocks. This may speed up the distance measurement processing and is more useful as the number of blocks (the number of light emitting element groups 21 and the number of light receiving regions 31) is increased to achieve high resolution.

Variations

Although the exemplary embodiments of the present disclosure have been described in detail, the present disclosure is not limited to the above exemplary embodiments and may be changed in various ways within the scope of the gist of the present disclosure recited in the claims. Variations (H01) to (H04) of the present disclosure are illustrated below.

(H01) Although the configuration in which light emission of the light emitting device 2 is controlled in the first to fourth lighting modes and the first to fourth inversion modes has been illustrated in the above exemplary embodiments, this is not restrictive. For example, the light emission of the first exemplary embodiment and conventional light emission in a checkerboard pattern may be switched between each other in accordance with user's setting or input. Specifically, in a situation where the light emission of the first exemplary embodiment is not needed such as a case where the size of the target 6 is sufficiently small relative to the distance measurable regions 71 or in a case where distance measurement in the distance unmeasurable regions 72 is not needed, distance measurement may be performed by a conventional distance measurement method in which the distance unmeasurable regions 72 occur.

Therefore, for example, in a case where stripe-shaped distance unmeasurable regions 72 along the Y direction (horizontal direction) are permitted above and below a specific portion, for example, in a case where a distance to a portion at a specific height of the target 6 that is being delivered in a horizontal direction by a belt conveyor or the like is measured, only the first lighting mode and the first inversion mode and the second lighting mode and the second inversion mode may be used. That is, it is also possible to employ a configuration in which the third lighting mode, the fourth lighting mode, and the like are not used. In this case, only the first unit of light emission 61 and the second unit of light emission 62 are used, and the third unit of light emission 63 and the fourth unit of light emission 64 are not used.

Similarly, in a case where stripe-shaped distance unmeasurable regions 72 along the X direction are permitted, only the first lighting mode and the first inversion mode and the third lighting mode and the third inversion mode may be used. That is, it is also possible to employ a configuration in which the second lighting mode, the fourth lighting mode, and the like are not used.

(H02) Although a case where a unit of light emission includes four (2×2) light emitting element groups 21 has been illustrated in the above exemplary embodiments, this is not restrictive. For example, a vertically long or horizontally long unit of light emission such as 2×1 or 2×3 may be used. Note that shift amounts of the second to fourth light emission modes from the first light emission mode in the X direction and/or the Y direction may be frecly changed in accordance with the size of the unit of light emission. Furthermore, the number of light emission modes is not limited to four (the first to fourth light emission modes) and may be increased to include a fifth light emission mode, a sixth light emission mode, . . . in accordance with the number of light emitting element groups that constitute the unit of light emission and the shift amounts. Although four (2×2) light receiving regions 31 are allocated to one irradiation region 32, the number of light receiving regions 31 allocated to one irradiation region 32 may be, for example, 2×3 or 3×3.

(H03) In the above exemplary embodiments, another example of time of flight that does not use a switch or the like may be used for a calculation method of light reception and distance measurement. In particular, when combined with not only a direct-time of flight (d-tof) method using pulsed light, but also an indirect-time of flight (i-tof) method using periodic light such as a sin wave, the light emission pattern of the present disclosure has more effect on noise removal.

Figures 14A, 14B:
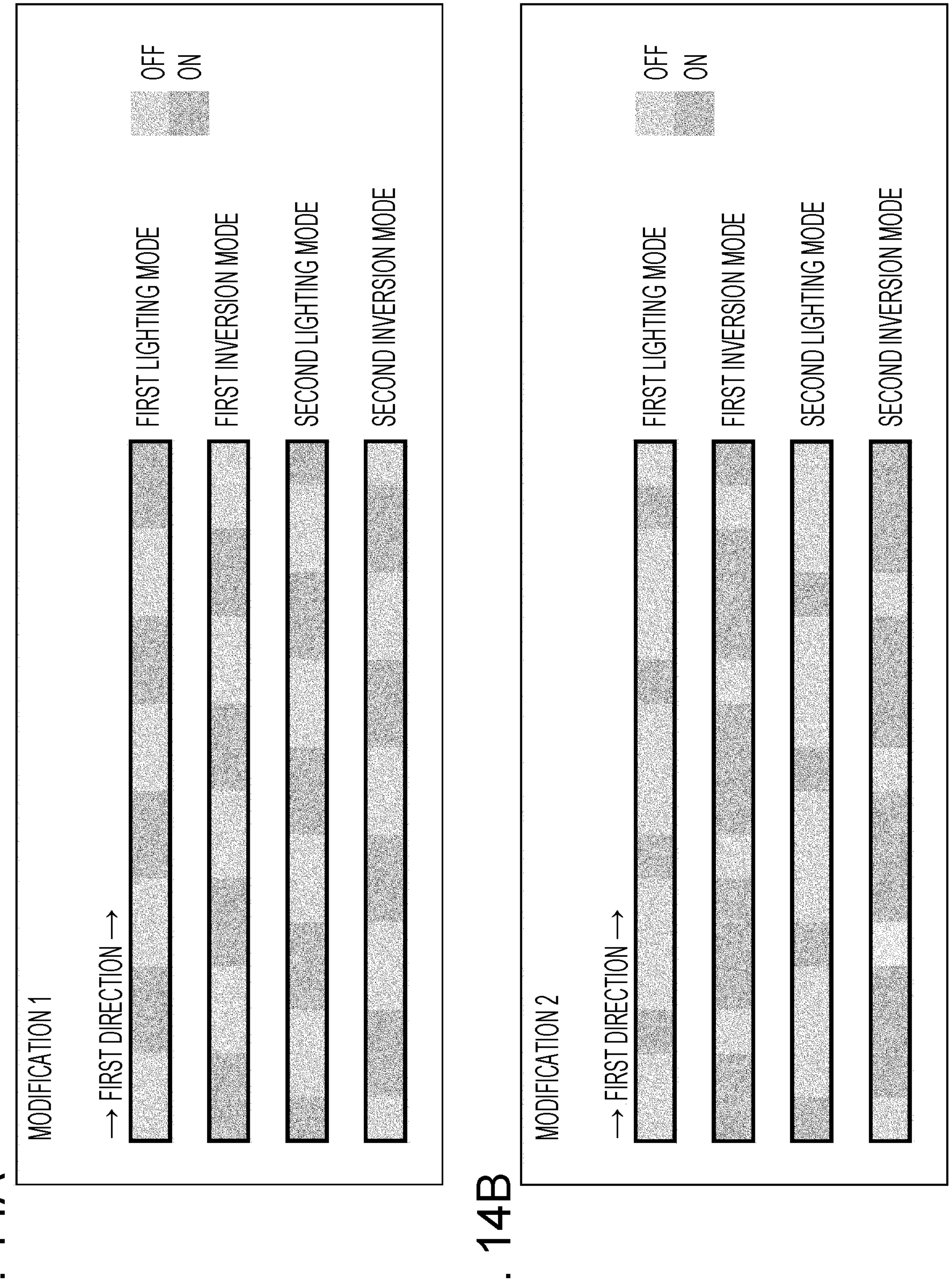
FIGS. 14A and 14B are explanatory views for explaining a modification.

FIGS. 14A and 14B are explanatory views for explaining modifications. FIG. 14A is an explanatory view for explaining Modification 1, and FIG. 14B is an explanatory view for explaining Modification 2.

(H04) Although an example in which plural units of light emission are arranged in the X direction and the Y direction in a light emission mode as illustrated in FIGS. 7A to 7D has been described in the above exemplary embodiments, this is not restrictive. For example, the units of light emission may be arranged only in the X direction, as illustrated in FIG. 14A. In this case, the number of light emitting elements in the second direction may be one or may be more than one. Although the units of light emission are constant (ranges and areas of the units of light emission are equal) in one direction in the above exemplary embodiments, the areas of the units of light emission may be irregular, as illustrated in FIG. 14B.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A distance measuring apparatus including:

plural light emitters that irradiate a target whose distance is to be measured with light and are arranged along a predetermined first direction;

an optical unit that directs light so that in a case where one light emitter emits light, a light amount corresponding to a central part of the light emitter and a light amount of a boundary part with an adjacent light emitter are different and in a case where plural light emitters emit light, the light amount corresponding to the central part of the light emitter and the light amount corresponding to the boundary part are equal;

a light emission control unit that controls ON and OFF of the light emitters, the light emission control unit controlling the light emitters in modes including a first lighting mode in which a combination of two or more light emitters along the first direction that is ON and a combination of two or more light emitters along the first direction that is OFF alternate, a first inversion mode in which ON and OFF are reverse to those in the first lighting mode, a second lighting mode in which a combination of two or more light emitters that is ON and a combination of two or more light emitters that is OFF alternate, the combination in the second lighting mode being shifted by at least one light emitter from the combination in the first lighting mode in the first direction, and a second inversion mode in which ON and OFF are reverse to those in the second lighting mode; and a distance measurement unit that, in a case where plural light receiving regions are provided corresponding to each of the light emitters along the first direction in a region where a light receiving unit receives light from the target, performs distance measurement on the basis of a light reception result in the first lighting mode and a light reception result in the first inversion mode in a light receiving region excluding a light receiving region corresponding to a first boundary part located at a boundary between ON and OFF in the first lighting mode, and performs distance measurement on the basis of a light reception result in the second lighting mode and a light reception result in the second inversion mode in a light receiving region excluding a light receiving region corresponding to a second boundary part located at a boundary between ON and OFF in the second lighting mode.

(((2)))

The distance measuring apparatus according to (((1))), in which in the first lighting mode, a first unit of light emission that is ON and a first unit of light emission that is OFF alternate in the first direction, the first unit of light emission being the combination of two or more light emitters along the first direction; and in the second lighting mode, a second unit of light emission that is ON and a second unit of light emission that is OFF alternate in the first direction, the second unit of light emission being the combination of light emitters shifted by one light emitter from the first unit of light emission in the first direction.

(((3)))

The distance measuring apparatus according to (((1))) or (((2))), in which the plural light emitters include plural light emitters arranged along a second direction that crosses the first direction.

(((4)))

The distance measuring apparatus according to (((3))), in which the light emission control unit controls the light emitters in the modes including a third lighting mode in which a combination of two or more light emitters that is ON and a combination of two or more light emitters that is OFF alternate, the combination in the third lighting mode being shifted by at least one light emitter from the combination in the first lighting mode in the second direction, a third inversion mode in which ON and OFF are reverse to those in the third lighting mode, a fourth lighting mode in which a combination of two or more light emitters that is ON and a combination of two or more light emitters that is OFF alternate, the combination in the fourth lighting mode being shifted by at least one light emitter from the combination in the first lighting mode in the first direction and the second direction, and a fourth inversion mode in which ON and OFF are reverse to those in the fourth lighting mode; and the distance measurement unit performs distance measurement on the basis of a light reception result in the third lighting mode and a light reception result in the third inversion mode in a light receiving region excluding a light receiving region corresponding to a third boundary part located at a boundary between ON and OFF in the third lighting mode, and performs distance measurement on the basis of a light reception result in the fourth lighting mode and a light reception result in the fourth inversion mode in a light receiving region excluding a light receiving region corresponding to a fourth boundary part located at a boundary between ON and OFF in the fourth lighting mode.

(((5)))

The distance measuring apparatus according to (((4))), in which in the third lighting mode, a third unit of light emission that is ON and a third unit of light emission that is OFF alternate in the second direction, the third unit of light emission being the combination of light emitters shifted by one light emitter from the first unit of light emission in the second direction; and in the fourth lighting mode, a fourth unit of light emission that is ON and a fourth unit of light emission that is OFF alternate in the first direction and the second direction, the fourth unit of light emission being the combination of light emitters shifted by one light emitter from the third unit of light emission in the first direction.

(((6)))

The distance measuring apparatus according to any one of (((1))) to (((5))), in which the light receiving unit includes a light receiver that generates a charge upon receipt of light, a first capacitor that is connected to the light receiver and is capable of accumulating a charge, a second capacitor that is connected in parallel to the first capacitor and is capable of accumulating a charge, and a switch that switches a connection destination of the light receiver between the first capacitor and the second capacitor; and the distance measurement unit performs distance measurement on the basis of a charge amount accumulated in the first capacitor and a charge amount accumulated in the second capacitor that are a light reception result.

(((7)))

The distance measuring apparatus according to (((6))), in which in a case where the light emitters are repeatedly turned on and off at predetermined first time intervals, the distance measurement unit performs distance measurement on the basis of a charge amount from which a charge amount accumulated during a non-light-emission state has been subtracted on the basis of a light reception result measured by switching the switch in accordance with the first time intervals and a light reception result measured by switching the switch at time intervals whose phase is shifted from the first time intervals.

(((8)))

The distance measuring apparatus according to (((6))) or (((7))), in which the distance measurement unit performs distance measurement on the basis of a light reception result obtained in a case where the light emitters are repeatedly turned on and off at predetermined first time intervals and a light reception result obtained in a case where the light emitters are repeatedly turned on and off at second time intervals different from the first time intervals.

(((9)))

A light emitting device for distance measurement that outputs light for distance measurement for measuring a distance to a target on the basis of light from the target, including:

plural light emitters that irradiate the target with light and are arranged along a predetermined first direction;

an optical unit that directs light so that in a case where one light emitter emits light, a light amount corresponding to a central part of the light emitter and a light amount of a boundary part with an adjacent light emitter are different and in a case where plural light emitters emit light, the light amount corresponding to the central part of the light emitter and the light amount corresponding to the boundary part are equal; and a light emission control unit that controls ON and OFF of the light emitters, the light emission control unit controlling the light emitters in modes including a first lighting mode in which a combination of two or more light emitters along the first direction that is ON and a combination of two or more light emitters along the first direction that is OFF alternate, a first inversion mode in which ON and OFF are reverse to those in the first lighting mode, a second lighting mode in which a combination of two or more light emitters that is ON and a combination of two or more light emitters that is OFF alternate, the combination in the second lighting mode being shifted by at least one light emitter from the combination in the first lighting mode in the first direction, and a second inversion mode in which ON and OFF are reverse to those in the second lighting mode.

What is claimed is:

1. A distance measuring apparatus comprising:

a plurality of light emitters that irradiate a target whose distance is to be measured with light and are arranged along a predetermined first direction;

an optical unit that directs light so that in a case where one light emitter emits light, a light amount corresponding to a central part of the light emitter and a light amount of a boundary part with an adjacent light emitter are different and in a case where a plurality of light emitters emit light, the light amount corresponding to the central part of the light emitter and the light amount corresponding to the boundary part are equal;

a light emission control unit that controls ON and OFF of the light emitters, the light emission control unit controlling the light emitters in modes including a first lighting mode in which a combination of two or more light emitters along the first direction that is ON and a combination of two or more light emitters along the first direction that is OFF alternate, a first inversion mode in which ON and OFF are reverse to those in the first lighting mode, a second lighting mode in which a combination of two or more light emitters that is ON and a combination of two or more light emitters that is OFF alternate, the combination in the second lighting mode being shifted by at least one light emitter from the combination in the first lighting mode in the first direction, and a second inversion mode in which ON and OFF are reverse to those in the second lighting mode; and a distance measurement unit that, in a case where a plurality of light receiving regions are provided corresponding to each of the light emitters along the first direction in a region where a light receiving unit receives light from the target, performs distance measurement on a basis of a light reception result in the first lighting mode and a light reception result in the first inversion mode in a light receiving region excluding a light receiving region corresponding to a first boundary part located at a boundary between ON and OFF in the first lighting mode, and performs distance measurement on a basis of a light reception result in the second lighting mode and a light reception result in the second inversion mode in a light receiving region excluding a light receiving region corresponding to a second boundary part located at a boundary between ON and OFF in the second lighting mode.

2. The distance measuring apparatus according to claim 1, wherein:

in the first lighting mode, a first unit of light emission that is ON and a first unit of light emission that is OFF alternate in the first direction, the first unit of light emission being the combination of two or more light emitters along the first direction; and in the second lighting mode, a second unit of light emission that is ON and a second unit of light emission that is OFF alternate in the first direction, the second unit of light emission being the combination of light emitters shifted by one light emitter from the first unit of light emission in the first direction.

3. The distance measuring apparatus according to claim 1, wherein:

the plurality of light emitters includes a plurality of light emitters arranged along a second direction that crosses the first direction.

4. The distance measuring apparatus according to claim 3, wherein:

the light emission control unit controls the light emitters in the modes including a third lighting mode in which a combination of two or more light emitters that is ON and a combination of two or more light emitters that is OFF alternate, the combination in the third lighting mode being shifted by at least one light emitter from the combination in the first lighting mode in the second direction, a third inversion mode in which ON and OFF are reverse to those in the third lighting mode, a fourth lighting mode in which a combination of two or more light emitters that is ON and a combination of two or more light emitters that is OFF alternate, the combination in the fourth lighting mode being shifted by at least one light emitter from the combination in the first lighting mode in the first direction and the second direction, and a fourth inversion mode in which ON and OFF are reverse to those in the fourth lighting mode; and the distance measurement unit performs distance measurement on a basis of a light reception result in the third lighting mode and a light reception result in the third inversion mode in a light receiving region excluding a light receiving region corresponding to a third boundary part located at a boundary between ON and OFF in the third lighting mode, and performs distance measurement on a basis of a light reception result in the fourth lighting mode and a light reception result in the fourth inversion mode in a light receiving region excluding a light receiving region corresponding to a fourth boundary part located at a boundary between ON and OFF in the fourth lighting mode.

5. The distance measuring apparatus according to claim 4, wherein:

in the third lighting mode, a third unit of light emission that is ON and a third unit of light emission that is OFF alternate in the second direction, the third unit of light emission being the combination of light emitters shifted by one light emitter from the first unit of light emission in the second direction; and in the fourth lighting mode, a fourth unit of light emission that is ON and a fourth unit of light emission that is OFF alternate in the first direction and the second direction, the fourth unit of light emission being the combination of light emitters shifted by one light emitter from the third unit of light emission in the first direction.

6. The distance measuring apparatus according to claim 1, wherein:

the light receiving unit includes a light receiver that generates a charge upon receipt of light, a first capacitor that is connected to the light receiver and is capable of accumulating a charge, a second capacitor that is connected in parallel to the first capacitor and is capable of accumulating a charge, and a switch that switches a connection destination of the light receiver between the first capacitor and the second capacitor; and the distance measurement unit performs distance measurement on a basis of a charge amount accumulated in the first capacitor and a charge amount accumulated in the second capacitor that are a light reception result.

7. The distance measuring apparatus according to claim 6, wherein:

in a case where the light emitters are repeatedly turned on and off at predetermined first time intervals, the distance measurement unit performs distance measurement on a basis of a charge amount from which a charge amount accumulated during a non-light-emission state has been subtracted on a basis of a light reception result measured by switching the switch in accordance with the first time intervals and a light reception result measured by switching the switch at time intervals whose phase is shifted from the first time intervals.

8. The distance measuring apparatus according to claim 6, wherein:

the distance measurement unit performs distance measurement on a basis of a light reception result obtained in a case where the light emitters are repeatedly turned on and off at predetermined first time intervals and a light reception result obtained in a case where the light emitters are repeatedly turned on and off at second time intervals different from the first time intervals.

9. A light emitting device for distance measurement that outputs light for distance measurement for measuring a distance to a target on a basis of light from the target, comprising:

a plurality of light emitters that irradiate the target with light and are arranged along a predetermined first direction;

an optical unit that directs light so that in a case where one light emitter emits light, a light amount corresponding to a central part of the light emitter and a light amount of a boundary part with an adjacent light emitter are different and in a case where a plurality of light emitters emit light, the light amount corresponding to the central part of the light emitter and the light amount corresponding to the boundary part are equal; and a light emission control unit that controls ON and OFF of the light emitters, the light emission control unit controlling the light emitters in modes including a first lighting mode in which a combination of two or more light emitters along the first direction that is ON and a combination of two or more light emitters along the first direction that is OFF alternate, a first inversion mode in which ON and OFF are reverse to those in the first lighting mode, a second lighting mode in which a combination of two or more light emitters that is ON and a combination of two or more light emitters that is OFF alternate, the combination in the second lighting mode being shifted by at least one light emitter from the combination in the first lighting mode in the first direction, and a second inversion mode in which ON and OFF are reverse to those in the second lighting mode.

10. A distance measuring apparatus comprising:

a plurality of light emitting means for irradiating a target whose distance is to be measured with light, the plurality of light emitting means being arranged along a predetermined first direction;

optical means for directing light so that in a case where one light emitting means emits light, a light amount corresponding to a central part of the light emitting means and a light amount of a boundary part with an adjacent light emitting means are different and in a case where a plurality of light emitting means emit light, the light amount corresponding to the central part of the light emitting means and the light amount corresponding to the boundary part are equal;

light emission control means for controlling ON and OFF of the light emitting means, the light emission control means controlling the light emitting means in modes including a first lighting mode in which a combination of two or more light emitting means along the first direction that is ON and a combination of two or more light emitting means along the first direction that is OFF alternate, a first inversion mode in which ON and OFF are reverse to those in the first lighting mode, a second lighting mode in which a combination of two or more light emitting means that is ON and a combination of two or more light emitting means that is OFF alternate, the combination in the second lighting mode being shifted by at least one light emitting means from the combination in the first lighting mode in the first direction, and a second inversion mode in which ON and OFF are reverse to those in the second lighting mode; and distance measurement means for, in a case where a plurality of light receiving regions are provided corresponding to each of the light emitting means along the first direction in a region where light receiving means receives light from the target, performing distance measurement on a basis of a light reception result in the first lighting mode and a light reception result in the first inversion mode in a light receiving region excluding a light receiving region corresponding to a first boundary part located at a boundary between ON and OFF in the first lighting mode, and performing distance measurement on a basis of a light reception result in the second lighting mode and a light reception result in the second inversion mode in a light receiving region excluding a light receiving region corresponding to a second boundary part located at a boundary between ON and OFF in the second lighting mode.

* * * * *